(12) United States Patent
Kark et al.

(10) Patent No.: US 6,898,725 B2
(45) Date of Patent: May 24, 2005

(54) METHOD FOR ADJUSTING SYSTEM CLOCKS USING DYNAMIC CLOCK RATIO DETECTOR TO DETECT CLOCK RATIO BETWEEN CLOCK DOMAIN OF DRIVER AND COUNTING RECEIVER CLOCK DOMAIN

(75) Inventors: Kevin W. Kark, Poughkeepsie, NY (US); Liyong Wang, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 10/108,100

(22) Filed: Mar. 27, 2002

(65) Prior Publication Data

US 2003/0188213 A1 Oct. 2, 2003

(51) Int. Cl.$^7$ .............................. G06F 1/04; G06F 1/12
(52) U.S. Cl. ...................... 713/502; 713/400; 713/500
(58) Field of Search ................................. 713/400, 500, 713/502, 600

(56) References Cited

U.S. PATENT DOCUMENTS

| | | | |
|---|---|---|---|
| 5,459,855 A | * | 10/1995 | Lelm .......................... 713/400 |
| 5,978,929 A | * | 11/1999 | Covino et al. ............... 713/503 |
| 6,112,307 A | * | 8/2000 | Ajanovic et al. ............ 713/400 |
| 6,338,127 B1 | | 1/2002 | Manning ...................... 711/167 |
| 6,340,904 B1 | | 1/2002 | Manning ...................... 327/156 |
| 6,393,502 B1 | * | 5/2002 | Meyer et al. .................. 710/58 |
| 6,505,261 B1 | * | 1/2003 | Meyer et al. .................. 710/58 |
| 6,584,575 B1 | * | 6/2003 | Meyer et al. ................ 713/400 |
| 6,633,994 B1 | * | 10/2003 | Hofmann et al. ............ 713/600 |
| 6,788,655 B1 | * | 9/2004 | Underbrink ................. 370/324 |

FOREIGN PATENT DOCUMENTS

| | | | |
|---|---|---|---|
| JP | 10075344 | * | 3/1998 |
| JP | 2001306491 | * | 11/2001 |

* cited by examiner

Primary Examiner—Chun Cao
(74) Attorney, Agent, or Firm—Lynn L. Augspurger

(57) ABSTRACT

Disclosed is a method and a computer circuit design for a dynamic clock ratio detector. The detector is used to determine the ratio between two clock domains. The detector has a driver 101 and a receiver, which reside in different clock domains. The driver 101 constantly produces a ratio clock pulse to the receiver. The ratio-counter in the receiver counts the pulse width based on its local clock cycles. The clock ratio detector has many features, including absorbing the meta-stability effect when the pulse crosses an asynchronous interface. The clock ratio detector prevents output counts oscillation, provides an adjustable ratio-detecting coverage range, a programmable system-parameter generator 104, and a programmable error reporter 105.

10 Claims, 2 Drawing Sheets

METHOD FOR ADJUSTING SYSTEM CLOCKS USING DYNAMIC CLOCK RATIO DETECTOR TO DETECT CLOCK RATIO BETWEEN CLOCK DOMAIN OF DRIVER AND COUNTING RECEIVER CLOCK DOMAIN

FIELD OF THE INVENTION

This invention is related to application specific integrated circuit (ASIC) design and in particular to the ASICs having multiple clock domains and to a method for setting of those ASICs needs to dynamically adjust their clock domains with different clock ratios among clock domains.

Trademarks: S/390 and IBM are registered trademarks of International Business Machines Corporation, Armonk, N.Y., U.S.A. Other names may be registered trademarks or product names of International Business Machines Corporation or other companies.

BACKGROUND

Routinely now it is possible to generate an internal clock signal in a memory chip that is synchronized to an external clock signal, as in U.S. Pat. No. 6,340,904, entitled "Method and apparatus for generating an internal clock signal that is synchronized to an external clock signal" of Troy A Manning of Micron Technology, Inc., Boise, Id. Another of Troy Mannings patents, U.S. Pat. No. 6,338,127,entitled "Method and apparatus for resynchronizing a plurality of clock signals used to latch respective digital signals, and memory device using same" filed Aug. 28, 1998 and issued Jan. 8, 2002 describes a computer chip related system that adaptively adjusts the phases of a plurality of internal clock signals, each respective internal clock signal causing a corresponding latch to store a digital signal responsive to the respective internal clock signal. The system includes a plurality of clock control circuits, each clock control circuit controlling the phase of a respective internal clock signal relative to a corresponding external clock signal responsive to a respective phase command signal. Generally, in computer systems of the past represented by IBM's S300 and z900 systems, the clock frequency and phase relationship are fixed among the computer's Central Processor (CP), Storage Controller (SC), Main Storage Controller (MSC) and Memory and memory adjusts to the signals providing this fixed relationship. This design strategy simplifies the design implementation and debug procedure, but has certain limitations resulting which can make it impossible to optimize efficiency of particular elements of the computer system in order to maximize the system performance.

SUMMARY OF THE INVENTION

We have found it desirable to develop the capability of using a dynamic clock ration detector to allow use of Asynchronous Interfaces in CP and MSC organization which allows a manufacturer to breaks the dependency among clocks in CP, SC and MSC, and allows them to be optimized to desired clock frequency independently. In accordance with our invention we have provided a dynamic clock ratio detector that constantly monitors system clocks and detects the clock ratio between multiple clock domains on-the-fly. In accordance with our preferred embodiment of our invention, our dynamic clock ratio detector for a computer circuit system is used to determine the ratio between two clock domains of the computer circuit system. The detector has a driver and a receiver, which reside in different clock domains. The driver constantly produces a ratio clock pulse to the receiver. The ratio-counter in the receiver counts the pulse width based on its local clock cycles. The clock ratio detector has many features, including absorbing the meta-stability effect when the pulse crosses an asynchronous interface. Our clock ratio detector prevents output counts oscillation, provides an adjustable ratio-detecting coverage range, a programmable system-parameter generator, and a programmable error reporter.

These and other improvements are set forth in the following detailed description. For a better understanding of the invention with advantages and features, refer to the description and to the drawings.

Our detailed description explains the preferred embodiments of our invention, together with advantages and features, by way of example with reference to the drawings.

DETAILED DESCRIPTION OF THE INVENTION

As we found it desirable to develop the capability of using a Asynchronous Interfaces in CP and MSC organization which allows a manufacturer to breaks the dependency among clocks in CP, SC and MSC, and allows them to be optimized to desired clock frequency independently we recognized that this dramatic advantage would not normally come without cost. Besides adding design and verification efforts of the asynchronous interface, the designers have to maintain multiple sets of parameters used in system (system settings) for different clock ratios instead of just one set as before. Moreover, whenever the clock ratios among system clocks change, the system has to go through power-on reinitialization process again, which is a time-consuming procedure.

In accordance with our invention we have provided a dynamic clock ratio detector for one or more computer circuits which can be manufactured as ASICs that constantly monitors system clocks and detects clock ratio on-the-fly. This clock-ratio detector is to detect the clock-ratio between two clock-domains on the fly and output proper system settings. The detector can also report errors if illegal drifting of the clock ratio is detected.

Figure 1:
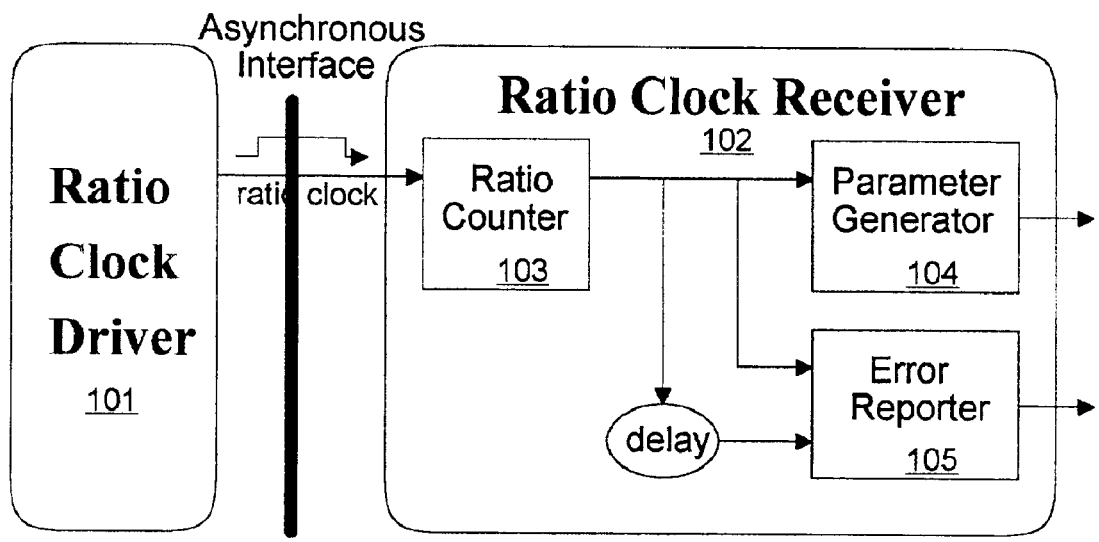
FIG. 1 illustrates a block diagram of the Clock Ratio Detector illustrating the preferred embodiment of the invention.

FIG. 1 shows the structure of the dynamic clock ratio detector. The detector consists two physical parts: a ratio-clock driver 101 in one circuit clock domain and a ratio-clock receiver 102 for one or more other clock domains of the computer circuit system. The driver and receivers of the computer circuit system are in different clock domains.

Figure 2:
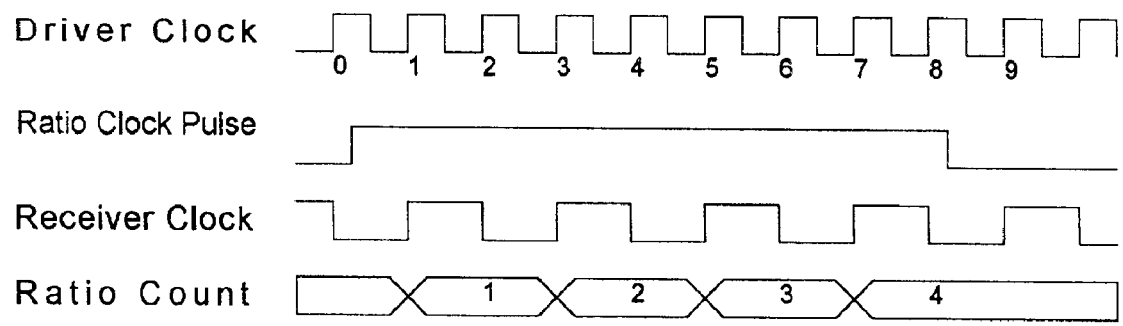
FIG. 2 illustrates the principle of how the clock ratio is calculated.

The ratio-clock driver 101 constantly outputs ratio-clock pulses. The pulse width of this ratio-clock equals to certain number (M) of driver's clock cycles. The number is pre-defined and known by both driver 101 and receiver 102. This wide pulse propagates through asynchronous interface and is received by the ratio clock receiver 102, which is on the opposite side of asynchronous interface where the clock-ratio clock output signal reaches the receiver ratio counter unit 103. The receiver 102 then counts the width of the pulse based on its local clock cycle time and calculates the clock ratio. FIG. 2 illustrates how this procedure is done. In this example, the receiver's clock runs at half of the speed of driver's clock. The pulse width of the ratio-clock driver output signal is 8 driver's clock cycles. After the pulse of the ratio-clock output signal arrives at receiver 102, the ratio clock receiver 102 with the ratio counter 103 counts the pulse as 4 receiver's local clock domain cycles, which brings the result of clock ratio as 4/8=0.5

The number of pulse width M is desired to be powers of 2. A larger value increases granularity and accuracy but increases the time to detect a clock ratio change (response time) as well. The number is programmable, which is chosen as 128 in our preferred embodiment.

The ratio-clock receiver 102 has 3 functional units: ratio-counter unit 103, a parameter generating unit 104 and error-reporting unit 105. (ref. To FIG. 1) which receives the output of the ratio counter 103 and a delayed output of the ratio counter.

Ratio Counter Unit 103

The ratio counter unit 103 counts the width of incoming ratio-clock pulse based on the receiver's local clock cycle, as N. Since it knows that the width of this clock pulse is produced based on M remote driver clock cycles, it can deduce the clock ratio by the formula below:

Ratio $r$=remote cycles/local cycles=$N/M$

The r here usually will be a real number, but the clock ratio output has to be an integer in a digital machine. If we consider a predefined resolution, then the ratio number R in a real machine can be represented as:

$r=R/\text{resolution}$

So R is:

$R=N*\text{resolution}/M$

In our preferred computer circuit application, the resolution is set to be 16 and M is 128. So that the final formula will be:

$R=N/8$

Besides the basic ratio-counting ability, there are some features in clock ratio detector design in our application and we will discuss each in the numbered areas of this description below.

Figure 3:
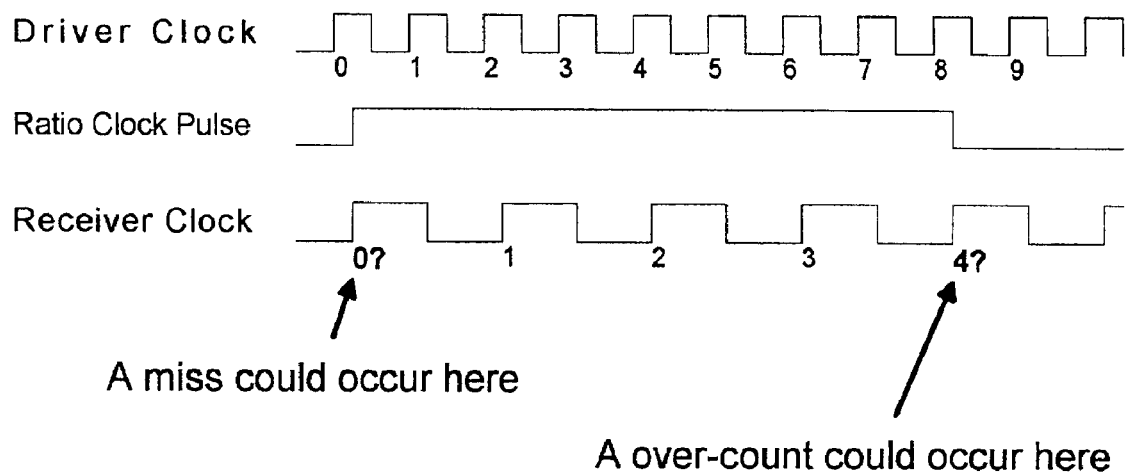
FIG. 3 illustrates an explanation of miscounting cycles due to meta-stability behavior of asynchronous interface crossing.

1. Overcome Meta-Stability Effect when Signal Crosses Asynchronous Interface:

A meta-stability effect occurs when the edge of a data signal of a latch is too close to the launching edge of its clock inputs. Under this condition, the output of the latch is undetermined. With multiple clock domains, the clock relationship among domains might not be fixed. If a signal is launched from one clock domain and is captured in the other clock domain, the timing relationship between launching a signal and the signal getting captured would not be fixed. That means the capture latch could miss or over-capture a data signal. This uncertainty causes clock ratio receiver 102 to miscount the width of ratio clock pulse and thus output a wrong clock ratio value. FIG. 3 illustrates this potential problem. If the receiver clock edge is very close to the rising and falling edge of ratio clock pulse, then a potential miscount might occur. In the example shown in FIG. 3, the final counted number could be 3, 4 or 5 cycles.

The ratio counter 103 in our preferred computer circuit application overcomes this problem by giving itself an initial value ($N_0$). So the formula for R above becomes $R=(N+N_0)*\text{resolution}/M$ This will guarantee that count changes due to any meta-stability effect will not affect the final ratio output value. E.g. With the M=128 given above as in our preferred computer circuit application, if the clock ratio is 1/2, theoretically, the receiver counts pulse width as 64, and the ratio output would be 64/8=8. However, if the receiver 102 misses one cycle, the count would be 63, and the ratio output would be 63/8=7. But if the counter 103 in the receiver 102 had an initial value of 5, then the final count would be 68, which will still get the ratio output as 68/8=8.

2. Oscillation Control:

At certain ratio of two clocks, the final counter value could be right at the edge of changing to the next one. If clocks fluctuate a bit under this condition, the clock ratio output could oscillate between adjacent values and cause unnecessary changes of system behavior or even errors being reported. The design of this ratio detector would prevent it. The detector will waive the change of output if the newly calculated ratio just increases by 1. In another word, the threshold to change to adjacent value is dynamically adjusted.

3. Adjustable Coverage Window:

Since the output clock ratios can only be discrete numbers, but clock cycle time is a real number, each number actually represents a range of clock ratios (window). The ratio range of each coverage window is fixed and determined by desired resolution. However, the upper and lower bounds of each range can be adjusted by the initial value of ratio counter 103 in receiver 102. This gives us the ability to fine-tune the accuracy of the clock ratio detector.

Error-Reporting Unit 105

Although the parameter can be adjusted on-the-fly depending on detected ratio, a system might not allow certain clock frequency changes, e.g. The ratio might only increase, or the clock can not change in the middle of operations. An error could be reported if such illegal change of clock ratio is detected. The changing direction to trigger the error-reporting can be programmed as ratio increasing, ratio decreasing, ratio changing (both increasing and decreasing are allowed) and none (all changes are not allowed). Changing clock ratio when the chip is busy is not allowed and will be reported as an error.

Parameter Generating Unit 104

This unit alters/optimizes system setting based on clock ratios given by the ratio counter 103.

Industrial Applications

This dynamic clock ratio detector brings many advantages, especially in a system allowing for asynchronous interfaces between chips. First, the system needs not to be shutdown, reinitialized again when the clock frequency is changed. One application for a dynamic clock ratio detector is that during system-testing, one of objectives of a tester is to find out operational clock-ratio range of a system. With the clock ratio detector implemented, the tester can just simply change clock frequency, and observe system behavior without reinitialize the machine. Another application for a dynamic clock ratio detector is computer systems in which the machine is shipped with default settings and yet the machine can easily be modified to adapt the original machine design data to new clock frequencies due to various reasons, such as technology changes. Additionally for any application the clock ratio detector automatically outputs proper system settings. This ability can effectively prevent systems from breakdown due to clock drifting. The detector can also bring dynamically changing clocks possible. In the future, a system may be able to run at high-performance, normal and power-saving mode, which needs different clock ratios, and switch itself back and forth within these modes without any reinitialization. The detector provides the ability to automatically adjust system setting without system being stopped, quiesce or reinitialized. Further, with the improvements described for dynamic clock ratio detection:

1. The detector has the ability to be programmed with desired detecting resolution of clock ratio.
2. The detector has the ability to speed up detector response time.
3. The detector has the ability to detect and report ratio-change errors during system busy time.
4. The detector has the ability to report illegal clock-ratio movement/drifting.
5. The detector can be disabled for backward-compatibility.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for adjusting system clocks in a computer circuit having multiple clock domains, comprising providing to a dynamic clock ratio detector receiver that constantly monitors system clocks and detects a clock ratio between multiple clock domains on-the-fly a ratio-clock driver output signal of a known pulse width sent from a driver clock domain to one or more receivers of said computer circuit and counting the pulse width in a ratio clock receiver in a receiver clock domain of said dynamic clock ratio detector receiver based on a local clock cycles of said receiver clock domain to detect dynamically the clock ratio between a clock domain of the driver clock domain and the counting receiver clock domain.

2. The method according to claim 1 wherein the ratio-clock driver constantly outputs ratio-clock pulses and the pulse width of these ratio-clock pulses is equal to certain number (M) of driver's clock cycles which certain number is predefined and known by both driver clock domain and receiver clock domain to enable a counter of a receiver clock domain to deduce a dynamically detected clock ratio between a the clocks of sending and receiving clock domains based on the counted number of local clocks during the pulse width of the constantly outputted ratio-clock pulses sent.

3. The method according to claim 2 wherein if an driver output signal is launched from one clock domain and is captured in another other clock domain, the timing relationship between the launching of the output signal and the output signal getting captured within a clock receiver domain would not be fixed and a capturing latch of said clock receiver domain could miss or over-capture an output signal causing a potential miscounting problem due to a meta-stability effect when a signal crosses an asynchronous interface between clock domains, however the output clock ratio will not be affected if the counter in receiver misses or over-count few cycles as the miscount is programmably corrected for any miscount.

4. The method according to claim 3 wherein to prevent oscillation of output clock ratio counts the clock receiver output ratio will not change if current ratio only differs from a previous ratio by 1.

5. The method according to claim 4 wherein the receiver count is programmably corrected to adjust a ratio range of coverage window by each integer ratio.

6. The method according to claim 4 wherein is provided programmability to choose an optimal point between desired clock-ratio resolution and response detection time.

7. The method according to claim 1 wherein a parameter generator of said receiver clock domain outputs system settings based on the clock ratio information from a clock ratio counter receiving pulses from said driver clock domain.

8. The method to claim 7 wherein an error reporter report any illegal increasing and decreasing clock ratios which result from clock ratio information from a clock ratio counter receiving pulses from said driver clock domain.

9. The method according to claim 3 wherein a parameter generator of said receiver clock domain outputs system settings based on the clock ratio information from a clock ratio counter receiving pulses from said driver clock domain.

10. The method according to claim 9 wherein an error reporter report any illegal increasing and decreasing clock ratios which result from clock ratio information from a clock ratio counter receiving pulses from said driver clock domain.

* * * * *